Figure 4:
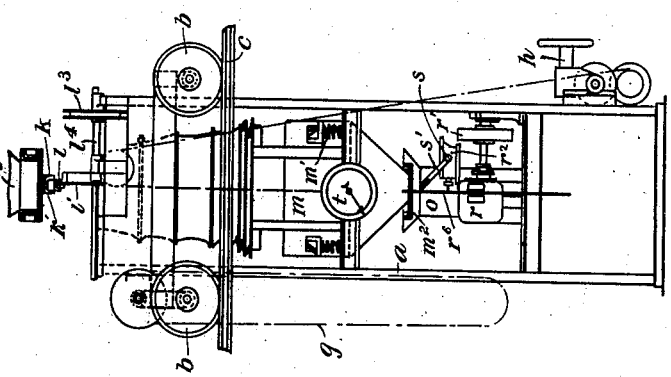

J. WEST.
CHARGING MACHINE FOR GAS RETORTS.
APPLICATION FILED DEC. 9, 1904.
898,538.
Patented Sept. 15, 1908.
9 SHEETS—SHEET 1.
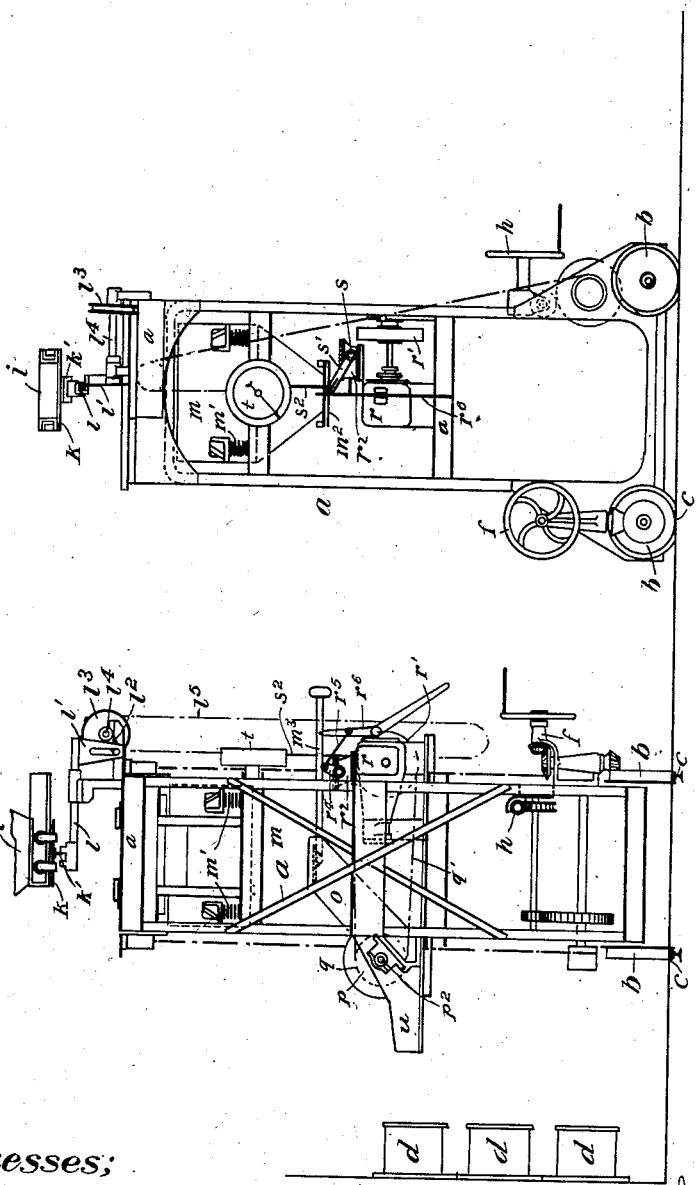

J. WEST.
CHARGING MACHINE FOR GAS RETORTS.
APPLICATION FILED DEC. 9, 1904.

898,538.

Patented Sept. 15, 1908.
9 SHEETS—SHEET 2.

Witnesses;
James C. Herron.
P. A. Williams

Inventor;
John West
per John H. Roney
his Atty.

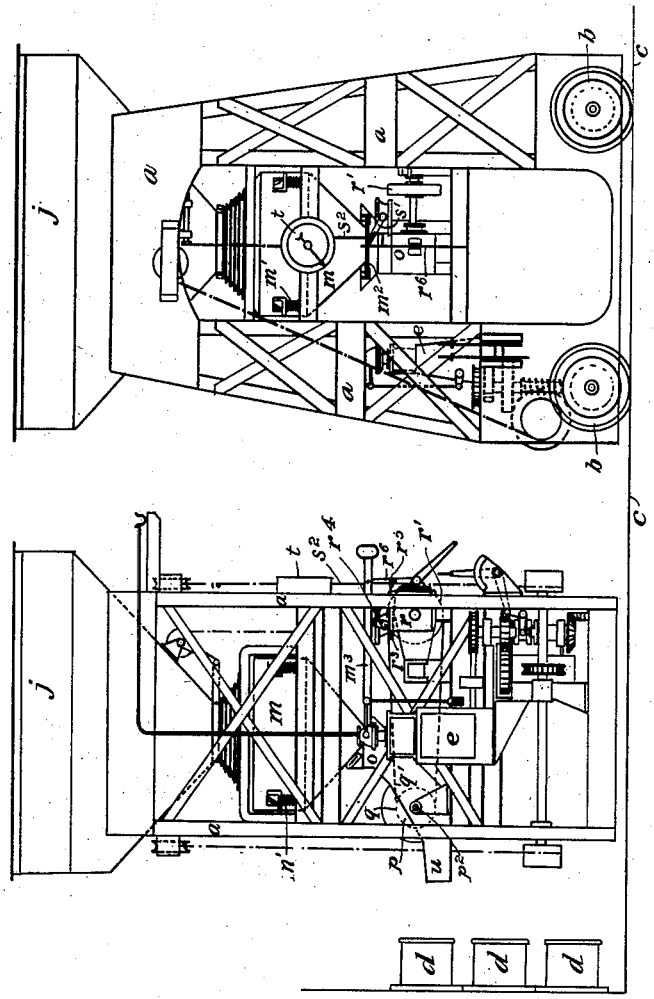

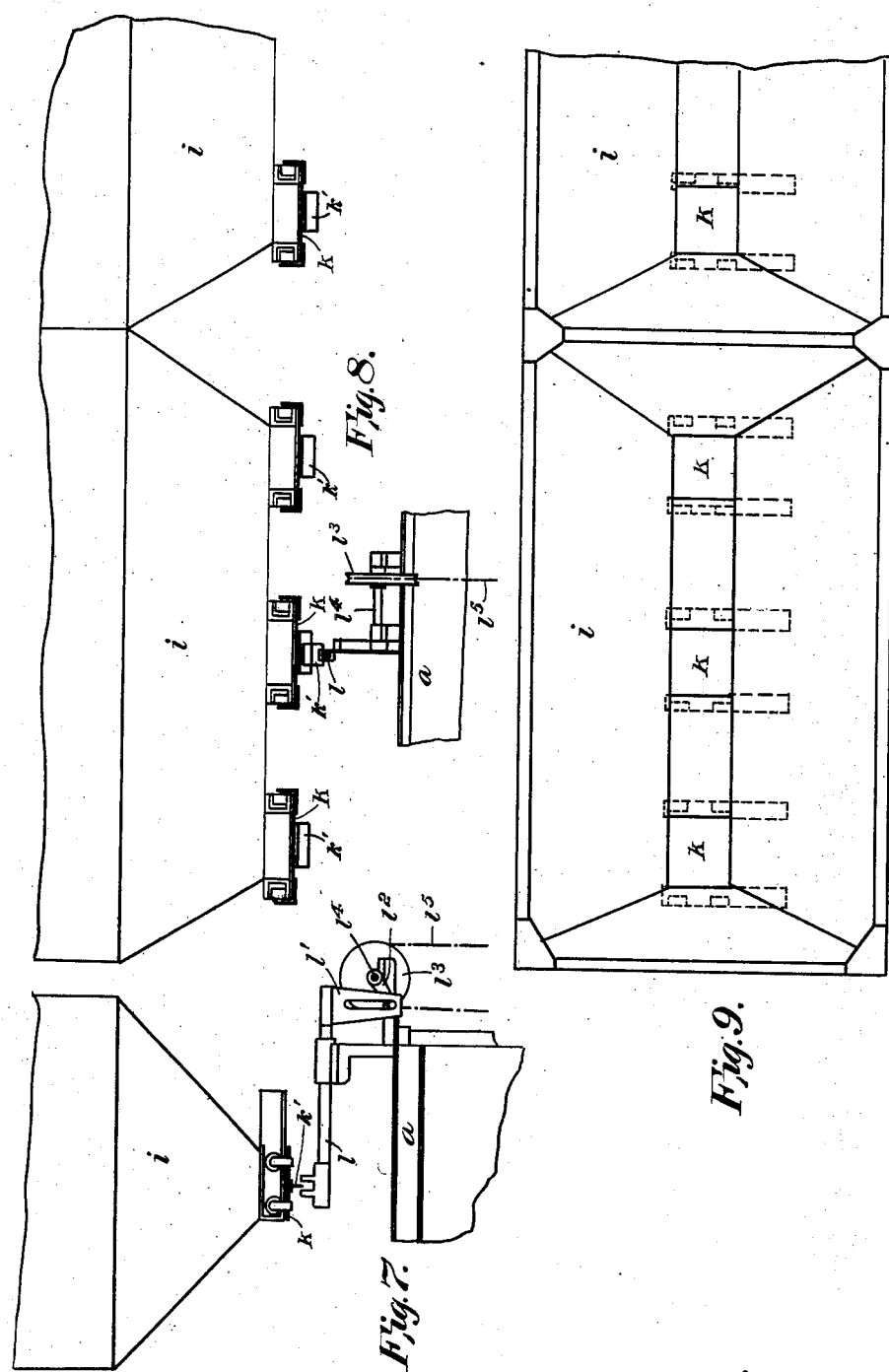

J. WEST.
CHARGING MACHINE FOR GAS RETORTS.
APPLICATION FILED DEC. 9, 1904.
898,538.
Patented Sept. 15, 1908.
9 SHEETS—SHEET 5.
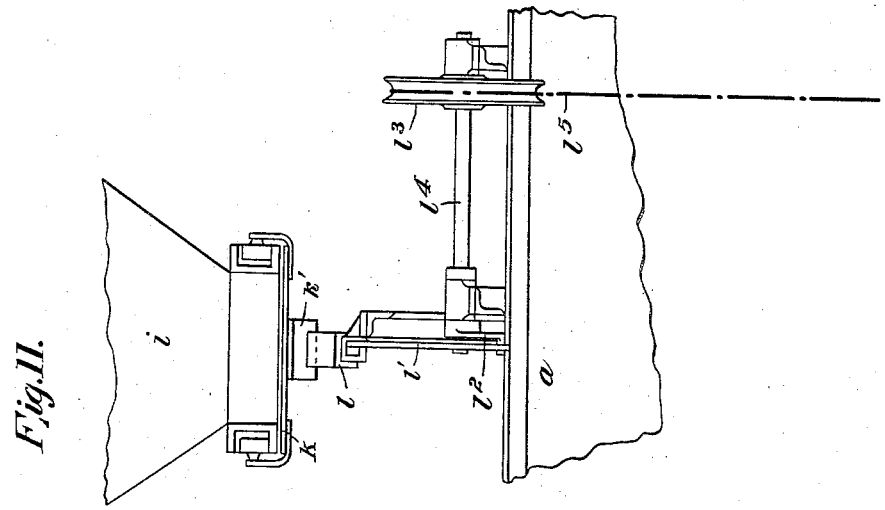
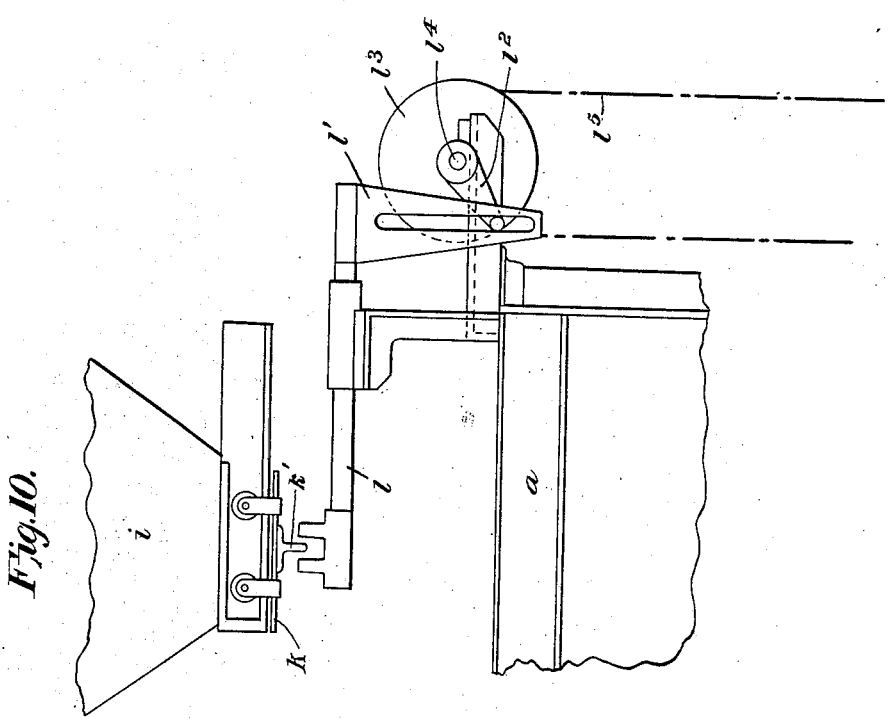

J. WEST.
CHARGING MACHINE FOR GAS RETORTS.
APPLICATION FILED DEC. 9, 1904.

898,538.

Patented Sept. 15, 1908.
9 SHEETS—SHEET 6.

Witnesses;
James C. Herron.
P. A. Williams

Inventor,
John West
John H. Roney
his Atty.
per

J. WEST.
CHARGING MACHINE FOR GAS RETORTS.
APPLICATION FILED DEC. 9, 1904.

898,538.

Patented Sept. 15, 1908.
9 SHEETS—SHEET 7.

Witnesses;
James C. Herron.
P. A. Williams.

Inventor;
John West
per John H. Roney
his Atty.

J. WEST.
CHARGING MACHINE FOR GAS RETORTS.
APPLICATION FILED DEC. 9, 1904.
898,538.
Patented Sept. 15, 1908.
9 SHEETS—SHEET 8.
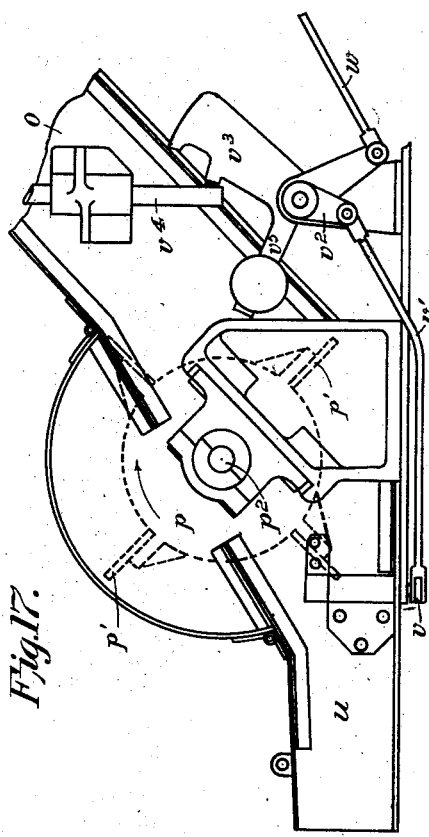
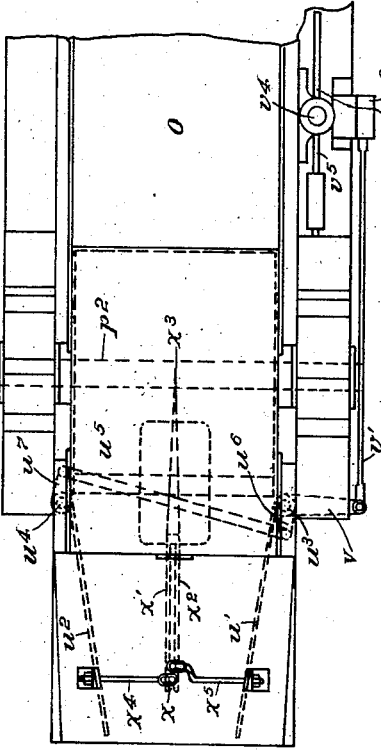
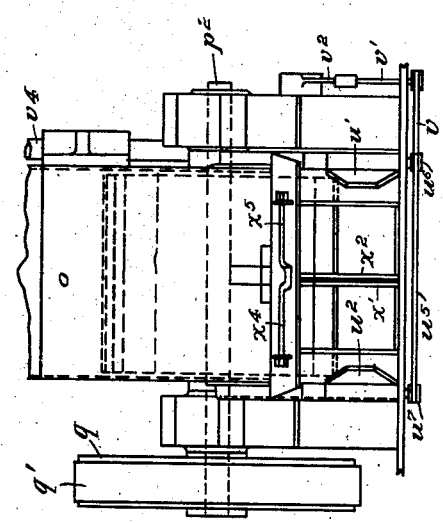
Witnesses:
James C. Herron.
P. A. Williams
Inventor,
John West
per John H. Roney
his Att'y.

J. WEST.
CHARGING MACHINE FOR GAS RETORTS.
APPLICATION FILED DEC. 9, 1904.
898,538.
Patented Sept. 15, 1908.
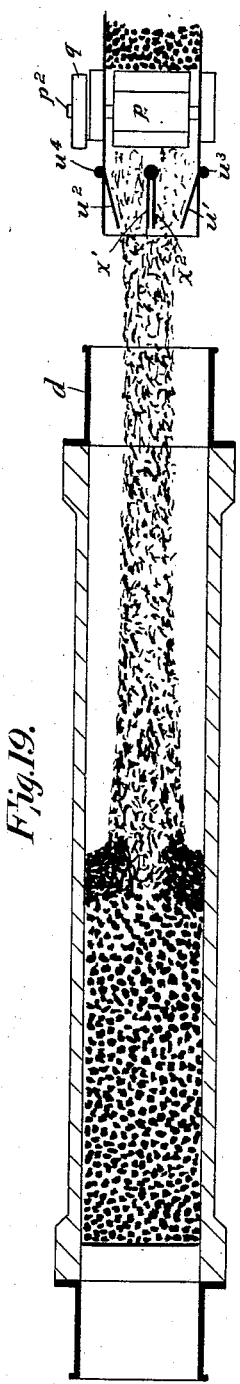
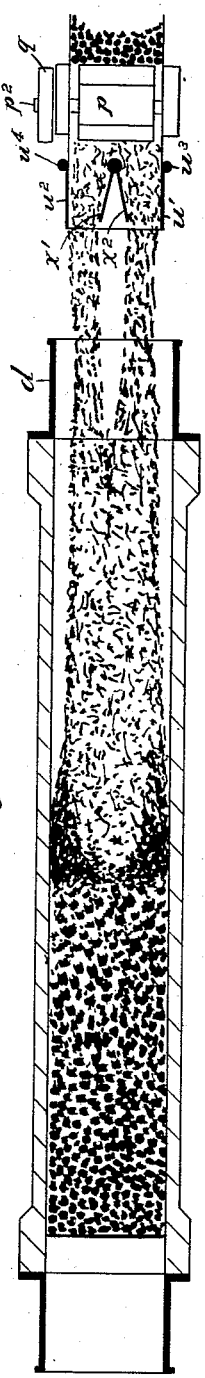

UNITED STATES PATENT OFFICE.

JOHN WEST, OF SOUTHPORT, ENGLAND.

CHARGING-MACHINE FOR GAS-RETORTS.

No. 898,538.  Specification of Letters Patent.  Patented Sept. 15, 1908.

Application filed December 9, 1904. Serial No. 236,211.

*To all whom it may concern:*

Be it known that I, JOHN WEST, a subject of the King of Great Britian and Ireland, residing at The Firs, Park Road, Southport, in the county of Lancaster, England, have invented certain new and useful Improvements in Charging-Machines for Gas-Retorts; and I do hereby declare the following to be a full, clear, and exact description of the invention, such as will enable others skilled in the art to which it appertains to make and use the same.

My invention relates to the charging or delivering of coal into gas retorts by means of a machine which travels along a rail path which is parallel with the front of the retort settings, the machine consisting of a trolley supporting a coal hopper and charging apparatus constructed as hereafter described for throwing the coal into the retorts and distributing it on the floor of the same in an even depth in thickness and of the full length of the retort.

The coal hopper on the charging machine will be supplied with coal from one or any number of hoppers fixed overhead in the retort house and provided with bottom outlets fitted with slide doors which when opened allow the coal to fall from same by gravity into the coal hopper on the machine.

Hitherto fixed overhead coal hoppers for supplying retort charging machines have usually been constructed with slide outlet doors fitted with a separate set of hand levers for each outlet but in this invention the charging machine is provided with one set of levers which will be common for opening any one of the slide doors which may be directly above the charging machine, the slide door being provided with a projection in which the levers on the machine will engage when the machine is directly below the slide door of the overhead hopper from which the supply of coal is to be obtained. Hopper levers which are carried on the machine will therefore open and close the slide doors of the overhead coal hopper outlets.

The coal hopper on the charging machine in this invention serves several important purposes which are chiefly as follows:—It receives from the overhead hopper or hoppers the quantity of coal required for charging a retort and is supported on springs or other suitable balance gear which will enable the hopper to fall to a lower level when it is loaded with coal and to rise when the hopper is empty. The range of this fall is regulated by the strength or elasticity of the springs which support the hopper. This rise and fall will put into motion levers and gear connected with a weight recording apparatus with a dial indicating the amount or weight of coal contained in the hopper, but one of the most important functions caused by the fall or lowering of the hopper due to the emptying of the coal during the operation of charging a retort will be the regulating of the speed of the charging apparatus which requires to be working at a maximum speed at the commencement and during the first part of the charging; the speed reducing as the charging proceeds until at the completion of the charge the charging apparatus is running at its minimum speed; the regulation of the speed of the charging apparatus being accomplished by levers connected to and between the coal hopper and a speed regulator in connection with the driving motor or other suitable driving gear which may be adopted for the purpose of driving the charging apparatus, so that the fall or rise of the hopper will impart motion to the levers and regulate the speed of the charging apparatus to suit the size and distance the coal has to be thrown into the retort and the amount of coal that is required to be delivered into the retort.

At the base of the coal hopper on the charging machine is fitted a slide door immediately below a regulated outlet which door when opened enables the coal to fall down an inclined plane chute towards a revolving drum which is provided with a number of blades radiating from its center. These blades will receive the coal as it falls down the inclined plane chute from the hopper and carry it forward through a portion of a revolution of the drum when the latter will impart to the coal a velocity which will cause it to leave the blades and enter the retort, but before doing so the coal passes through an outlet passage placed immediately in front of the revolving drum. This outlet passage is so constructed that it will divert the shape and direction of the stream of coal ejected from the blades of the drum and cause it to be finally deposited in the retorts in an even depth throughout the entire length and width of the complete charge of coal.

The construction of the outlet passage in front of the revolving drum is an important part of this invention as it enables the stream of coal to be altered in shape and direction during the operation of charging the retort.

The outlet passage in front of the revolving drum is constructed of a rectangular shape but the sides are hinged at points near the drum and provided with levers to enable the sides at the outlet end of the passage to approach or recede from each other in order to contract or enlarge the orifice at this part, consequently when passing through the passage when the orifice is contracted the stream of coal is concentrated towards the center of the retort and when the sides are opened and the orifice widened the coal is directed towards the sides of the retort.

In addition to the adjustable hinged sides of the outlet passage in front of the revolving drum there is a central division constructed of two plates in the form of a V on plan the thin end of the section being placed nearest to the revolving drum. These plates are provided with levers connected with the levers operating the movable sides of the outlet passage so that when the front ends of the sides are closed in to contract the opening the plates forming the V division are caused to close towards each other. The central division will therefore when open assist in directing the coal towards the sides of the retorts and when closed offer little or no resistance to the passage of the coal from a straight line.

The levers for actuating the sides of the outlet passage and the division plate of the same will be set in motion by the fall and rise of the coal hopper and so adjusted that when the hopper is full the front of the outlets and the V division are contracted.

The charging machine will be provided with gear for traveling it along the retort house and also hoisting and lowering gear for adjusting the charger to the height of the retort to be charged.

In order that this invention may be readily understood, I will proceed to describe the same with reference to the accompanying drawings, in which I show the application of my invention to a charging machine for gas retorts.

Figure 3:
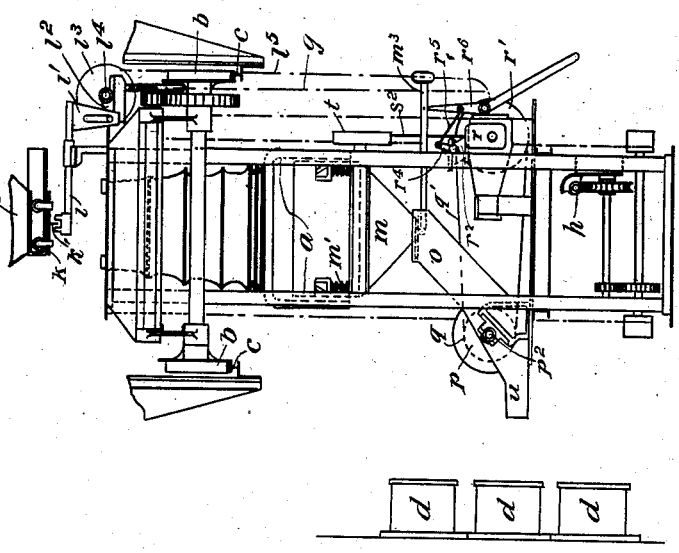
Figure 12:
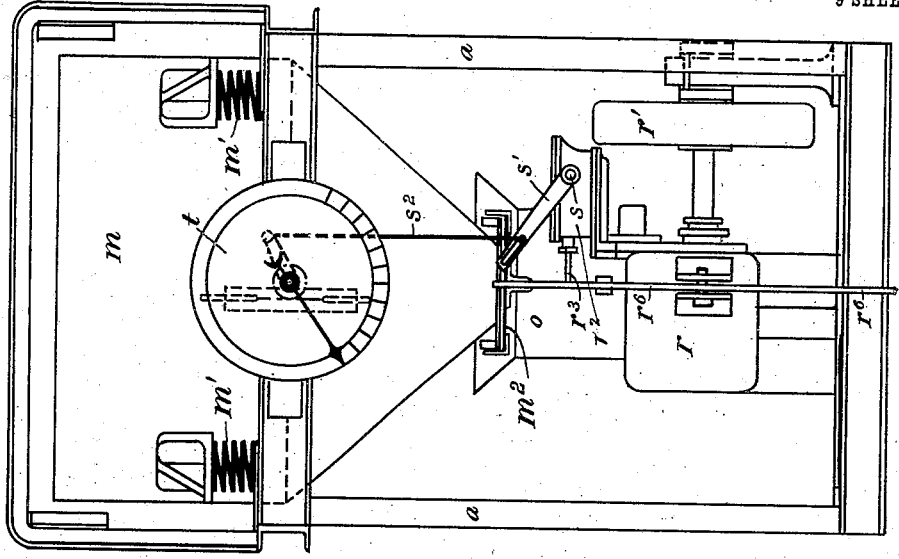
Figure 13:
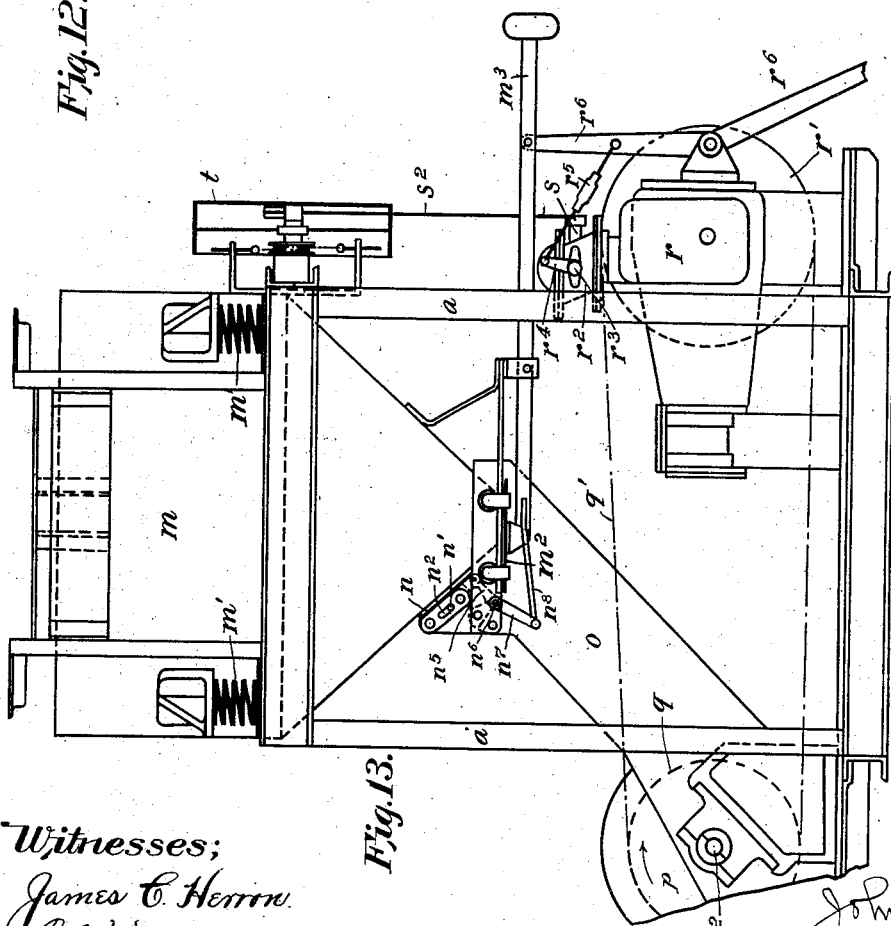
Figure 14:
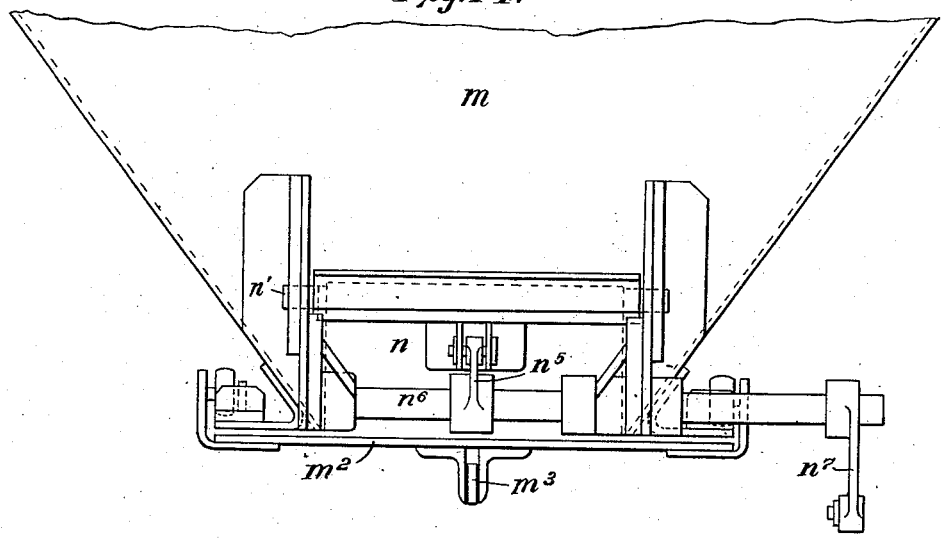
Figure 15:
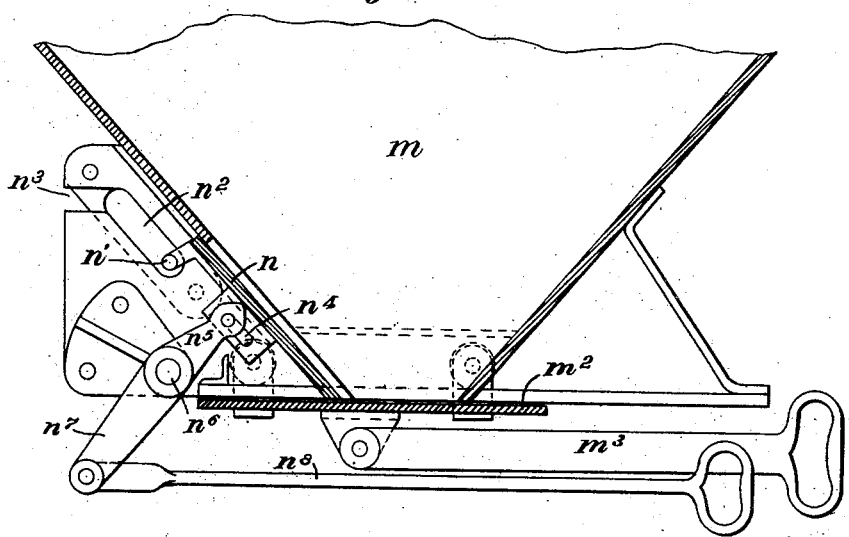

Figures 1 and 2 are two elevations of the charging machine supported on wheels which run along the rails laid in the retort house floor. Figs. 3 and 4 are two elevations of the charging machine supported on wheels which run along rails fixed overhead and suspended from girders spanning between the retort bench and the retort house walls or from the girders which support the overhead fixed coal hoppers. Figs. 5 and 6 are two elevations of the charging machine supported on wheels which run along rails laid in the retort house floor, this arrangement of the machine containing a large hopper for storing a quantity of coal to enable a number of retorts to be charged before the hopper requires replenishing with coal from overhead fixed coal hoppers. Fig. 7 is an end elevation, Fig. 8 is a side elevation, and Fig. 9 is a plan of the fixed overhead hoppers which hold a supply of coal for the charging machine which is provided with an arrangement of levers for opening and closing any of the coal outlet doors fitted to the base of the coal hoppers shown in these figures. Fig. 10 is a side elevation, and Fig. 11 is an end elevation of one of the slide outlet doors of the overhead coal hoppers and an arrangement of levers on the charging machine for opening the slide door when supplying the charging machine with coal and also for closing the door when the hopper on the charging machine is supplied with coal. Figs. 12 and 13 are elevations of the coal hopper of the charging machine; the arrangement of springs for supporting the coal hopper and weighing the coal and the dial indicating the weight of coal contained in the hopper. These views also show the general arrangement of the hopper slide outlet door, the chutes for feeding the coal from the hopper to the revolving drum of the charging apparatus and the motor and driving gear for revolving the drum. Fig. 14 is an elevation, and Fig. 15 is a sectional elevation of enlarged details of the slide outlet door of the coal hopper on the charging machine, and the views also show the details of the door regulating the size of the outlet opening which is adjustable to suit the size and quantity of coal to be put into the retort. Figs. 16, 17 and 18 are end elevation, side elevation and plan of enlarged details of the charging apparatus with outlet passage having hinged sides and central division plates for directing the stream of coal into the retorts and depositing it there in the form desired for proper carbonization. Fig. 19 shows the position of the hinged sides and division plates of the outlet passage during the time the first portion of the retort is being charged with coal, and Fig. 20 shows the position of the hinged sides and division plates of the outlet passage during the completion of the charging of coal into the retort.

Referring to the Figs. 1 to 20 *a* is the main framework of a retort charging machine supported on wheels *b* which travel along rails *c* laid either in the floor of the retort house or suspended from girders above, to suit either of the several forms of the machine shown.

*d* is the mouthpiece of the retorts which have to be charged with coal by the machine, and *e* is a motor and gearing for traveling the machine along the rails and raising or lowering the charging apparatus to the level of the retorts to be charged or the machine may be fitted with hand propelling gear *f* for the machine traveling on rails laid in the retort house floor or *g* for the suspended charging machine; *h* is the manual power gear for raising and lowering the charging apparatus which in the examples shown have chains attached to the charging apparatus frame at one end and to chain barrels at the other end.

$i$ is the fixed overhead coal hopper from which the charging machine obtains its supply of coal, $j$ is a fixed coal hopper on the charging machine when same is constructed in the form to carry a supply of coal for a number of retorts as shown in Figs. 5 and 6 but not required in the examples shown in Figs. 1 to 4 which receive a fresh supply of coal from the overhead hoppers $i$ at each retort.

$k$ is an outlet slide door of the overhead hopper $i$ and $k'$ is a projection on the slide door in which projection a connecting rod $l$ of the levers for opening and closing the door engages when the machine is directly underneath the outlet to be opened.

An arrangement for giving a reciprocating motion to the connecting rod $l$ is shown in Figs. 7, 8, 10 and 11 and also on the machines shown in Figs. 1 to 4. This arrangement consists of a slotted plate $l'$, lever $l^2$ having a pin engaging in the slotted plate $l'$ and chain pulley $l^3$ fixed on a shaft $l^4$ to which is also fixed the lever $l^2$; the wheel $l^3$ is a chain pulley to which is fixed an endless chain $l^5$ enabling the machine attendant by pulling the chain to cause the lever $l^2$ to give a reciprocating motion to the connecting rod $l$ and the slide door $k$ of the coal hopper $i$. The arrangement shown for giving the reciprocating motion to the slide door may not be exactly as shown, as any convenient arrangement of levers for communicating a reciprocating motion may be adopted, the essential feature in my invention being the application of the levers on the charging machine for the purpose of opening and closing any of the slide doors of the overhead coal hopper below which the charging machine happens to be when receiving its supply of coal.

$m$ is the coal hopper on the charging machine and $m'$ are springs on which the coal hopper is supported, $m^2$ is a sliding door at the base of the coal hopper $m$, and $m^3$ is a hand connecting rod for opening and closing the door $m^2$.

$n$ is a flap door working on a hinged pin $n'$ which is caused by the action of the lever for adjusting the position of the door to slide up and down the slot $n^2$ in the slotted plates $n^3$ and $n^4$, a lever $n^5$ engages with the flap door $n$ and is fixed to a shaft $n^6$ which has a lever $n^7$ and hand connecting rod $n^8$ placed in a convenient position for the machine attendant.

The object of the flap door $n$ is to regulate the width of the outlet door opening of the hopper $m$. By the action of the levers $n^7$ and $n^5$ the width of the opening is either increased or decreased and the slotted plates for the hinged pin $n'$ enable the bottom edge of the flap door to keep close to the slide door $m^2$. The area of the outlet from the hopper $m$ is adjusted by means of the flap door $n$ to suit the coal, the slide door $m^2$ always opening to its full extent.

$o$ is a chute which receives the coal falling through the outlet of the hopper $m$; this chute directs the coal to the propeller plates $p'$ of the drum $p$ which revolves in the direction of the arrow shown in Fig. 17.

$q$ is the driving pulley on the drum shaft $p^2$ and this is driven by a belt $q'$ from a pulley $r'$ and motor $r$. The motor $r$ in the accompanying drawings is shown as a compressed air driven motor, but for the purpose of my invention the motor may be driven by any other power such as steam, gas, or electricity. $r^2$ is the main supply valve box for the motor $r$ if the latter is driven by compressed air or steam, but if the motor $r$ is an electrically driven motor the valve box $r^2$ would be replaced by a regulating speed rheostat.

$r^3$ is the spindle of the main starting valve in the valve box $r^2$ and $r^4$ is a lever on the end of same, $r^5$ is a connecting rod connecting the lever $r^4$ with a starting lever $r^6$. The starting lever $r^6$ is connected to the connecting rod $m^3$ of the slide door $m^2$ and therefore work together, consequently when the slide door is opened the main starting valve opens and the motor starts to work and the drum $p$ of the charging apparatus rotates.

In the starting valve box $r^2$ there is in addition to the starting valve an auxiliary valve for regulating the area of the supply to the main starting valve; this auxiliary valve when fully open enables sufficient compressed air to pass into the compressed air driven motor to permit the motor $r$ to run at full speed, but when the auxiliary valve is partly closed the speed of the motor is reduced, consequently the speed of the motor and revolutions of the drum $p$ of the charging apparatus may be regulated by the auxiliary valve.

The auxiliary valve is operated by the valve spindle $s$ and lever $s'$ connected to the coal hopper $m$ by a connecting rod $s^2$ and as the hopper $m$ is in its highest position when empty and the springs $m'$ are expanded, and when full it is in its lowest position and the springs $m$ are compressed, the connecting rod $s^2$ being attached to the hopper $m$ actuates the lever $s'$ and the valve spindle $s$ and regulates the area of the auxiliary valve port or opening and consequently regulating the supply of compressed air for driving the motor and the speed of same.

The speed of the motor and the charging apparatus is regulated automatically by the hopper $m$ actuating the auxiliary valve in a machine in which the drum $p$ is driven by a compressed air driven motor because the valve is opened in relation to the amount of coal contained in the hopper $m$, therefore when the hopper is full and the starting valve fully opened by the levers before described in connection with the slide door $m^2$ the hopper is in its lowest position and the auxiliary valve full open and the supply of compressed air will be sufficient to enable the motor to run at full speed, but as the coal hopper empties itself during the operation of charging a retort the hopper will rise and the air supply will be gradually cut off and the speed of the motor reduced, and this automatic regulation of the speed in relation to the weight of coal contained in the hopper is important to enable a retort to be charged evenly throughout its entire length and the auxiliary valve can be adjusted to suit the distance the coal has to be thrown into the retort.

In a machine driven by an electrically driven motor I replace the auxiliary valve by a speed regulating rheostat which will control the speed of the motor and this rheostat will be actuated by the hopper $m$ as described for the auxiliary valve.

In order that the machine attendant may know the weight of coal contained in the hopper $m$ an indicator dial $t$ is fixed on the machine, the hand or finger of the indicator being rotated or moved by the rise and fall of the hopper to which the mechanism driving the indicator finger is connected.

$u$ is an outlet passage immediately in front of the drum $p$, $u'$ and $u^2$ are hinged sides radiating from hinges $u^3$ and $u^4$. These hinged sides are coupled together by a connecting rod $u^5$ and levers $u^6$ and $u^7$ so that both sides are operated simultaneously.

A lever $v$ is fitted to one of the outlet passage sides and by means of the connecting rod $v'$ and levers $v^2$ coupled to a trip or catch lever $v^3$ which is so arranged that it may be put into a position to enable it to be operated by a vertical rod $v^4$ fitted to the hopper $m$. This vertical rod $v^4$ will release the trip or catch lever $v^3$ at a certain time during the operation of charging a retort and a weighted lever $v^5$ will cause the outlet passage sides $u'$ and $u^2$ to assume the position shown on the plan in Fig. 20.

After the retort is charged with coal the hinged sides are replaced in the position shown in Fig. 19, and this is accomplished with the rod $w$ which is connected with the levers of the hinged sides and may be either operated by the machine attendant or automatically by the hopper $m$ when the latter is being refilled with coal.

$x$ is a central division in the outlet passage $u$; it is of the full depth of the passage and constructed of two plates $x'$ and $x^2$ fastened together at and radiating from a point $x^3$; the other ends of the plates being free to approach to or recede from each other to form a contracting or expanding division plate which will assume a form in the shape of a V in plan when the ends are expanded. The plates $x'$ and $x^2$ are coupled to the hinged sides $u'$ and $u^2$ by connecting rods $x^4$ and $x^5$ and therefore when the hinged side plates $u'$ and $u^2$ approach each other the edges of the plates $x'$ and $x^2$ close towards each other as shown in Fig. 19 and when the hinged sides are in the position shown in Fig. 20 the division plate $x$ has its sides expanded as shown in this figure.

Having now described the parts forming a charging machine, I will now describe the operation of charging a retort.

By means of the traveling and adjusting gear the machine and charging apparatus is placed opposite the retort to be charged, the attendant then by pulling the chain $l^5$ opens the slide door $k$ of the overhead coal hopper $i$ and coal is then permitted to fall by gravity into the hopper $m$ on the machine and as this hopper fills the springs $m'$ are compressed and the hopper which is supported on them falls to a lower level, the amount of fall being indicated on the dial of the indicator $t$ which is marked to register the amount of coal contained in the hopper. Having obtained the weight of coal required for the charge the attendant then closes the door $k$ by the chain $l^5$ and opens the slide door $m^2$ by pulling the connecting rod $m^3$ or the lever $r^6$ connected to same; this increases the speed of the motor $r$ and the drum $p$ to that required for throwing the coal into the retort and at the same time the coal falls from the hopper $m$ and down the chute $o$ to the propeller blades, which receive and throw the coal through the outlet passage $u$ and into the retort. At the commencement of the charging the hinged side plates and division plates are in the position shown in Fig. 19 but after the retort has been partly charged the hinged sides and division plate of the outlet passage assume the position shown in Fig. 20 and the coal is delivered to the sides of the retort, and the retort will then be completely charged with an even layer of coal throughout its entire length. This result, especially in long retorts, would not have been attained had the outlet passage been constantly of the shape as shown in Fig. 19.

During the process of charging the retort the machine is automatically regulating the speed of the drum $p$ by the speed regulating gear operated by the rising of the coal hopper as the latter is being emptied of coal. The flap door $n$ is operated and regulated by the machine attendant to suit the depth of coal.

The foregoing description applies to machines arranged as in Figs. 1, 2, 3 and 4, but in machines as in Figs. 5 and 6, having a coal hopper containing a supply of coal for a number of retorts, the slide door will be fitted to this hopper instead of the hopper $i$, although the arrangement for opening and closing the doors of overhead coal hoppers for supplying this machine may be the same as in the machines shown in Figs. 1 to 4.

What I claim and desire to secure by Letters Patent is:—

1. In a retort charging mechanism, the combination of a hopper adapted to contain any required charge and adapted to be varyingly positioned with relation to the mechanism that actuates the motor by the varying weight of the contents thereof, a rotary charging machine, means to convey coal from said hopper to said charging machine, means to actuate said charging machine, and means actuated by the hopper for varying the speed of the motor correspondingly with the decrease in the weight of the contents of said hopper.

2. In a retort charging apparatus, the combination of a hopper supported upon balance mechanism, a rotary charging machine connected with said hopper, a motor adapted to actuate said charging machine, means actuated by the movement of said hopper to vary the supply of power to said motor whereby the speed of the same is varied, dependent upon the weight of the contents of said hopper.

3. In a mechanism for charging gas retorts, the combination of a hopper supported upon balance mechanism, a rotary charging machine, means for delivering coal from said hopper to said charging machine, means for regulating the discharge of coal from said charging machine into the retort, a motor adapted to operate said charging machine, means actuated by the movement of the hopper for regulating the speed of said motor whereby the discharge of coal therefrom is progressively regulated with reference to the decreasing weight of the contents of said hopper.

4. In an apparatus for charging gas retorts, the combination of a hopper, a charging machine, means connecting said hopper with said charging machine for opening and closing the discharge openings of said hopper, a motor adapted to operate said charging machine, and means actuated by the hopper for varying the speed of said motor.

5. In an apparatus for charging gas retorts, the combination of a hopper, a rotary charging machine connected with said hopper and having an outlet adapted to be positioned whereby the size thereof is regulated to correspond with the amount of coal passing from said hopper into said charging machine, and means associated with the hopper for regulating the speed of the charging machine, whereby the discharge of coal therefrom is progressively regulated with reference to the decreasing weight of the contents of said hopper.

6. In a retort charging apparatus, the combination with a hopper movably supported, of a charging machine, means for delivering coal from said hopper to said charging machine, adjustable discharge mechanism associated with said charging machine for regulating the discharge of the coal from the charging machine into the retort, a motor for operating said charging machine, and means actuated by the movement of the hopper for regulating the speed of the motor, whereby the discharge of coal is progressively regulated with reference to the decreasing weight of the contents of said hopper.

7. In a retort charging apparatus, the combination with a hopper movably supported, of a charging machine, means for delivering coal from said hopper to said charging machine, an adjustable discharge orifice for said charging machine, a device arranged in said orifice and operable to vary the direction of the coal passing through said orifice, whereby the retort will be completely charged with an even layer of the coal throughout its length, a motor for operating said charging machine, and means actuated by the movement of the hopper for regulating the speed of the motor, whereby the discharge of coal is progressively regulated with reference to the decreasing weight of the contents of said hopper.

In testimony whereof I have affixed my signature, in presence of two witnesses.

JOHN WEST.

Witnesses:
 ERNALD SIMPSON MOSELEY,
 MALCOLM SMETHURST.